(12) United States Patent
Hirakawa (10) Patent No.: US 8,721,246 B2
(45) Date of Patent: May 13, 2014

(54) FASTENERS

(75) Inventor: Katsuya Hirakawa, Okazaki (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/489,083

(22) Filed: Jun. 5, 2012

(65) Prior Publication Data

US 2012/0308333 A1  Dec. 6, 2012

(30) Foreign Application Priority Data

Jun. 6, 2011 (JP) .................................. 2011-126237
Aug. 31, 2011 (JP) .................................. 2011-188928
Apr. 6, 2012 (JP) .................................. 2012-87370

(51) Int. Cl.
*F16B 19/00* (2006.01)

(52) U.S. Cl.
USPC ...................................................... 411/508

(58) Field of Classification Search
USPC ............. 411/45–48, 182, 508, 509–510, 908, 411/913; 24/297, 453, 458
See application file for complete search history.

(56) References Cited

U.S. PATENT DOCUMENTS

| | | | | |
|---|---|---|---|---|
| 3,775,927 A * | 12/1973 | Meyer | ........................ | 52/718.06 |
| 4,431,355 A * | 2/1984 | Junemann | ..................... | 411/360 |
| 4,644,614 A * | 2/1987 | Mizusawa | ...................... | 24/453 |
| 4,787,795 A * | 11/1988 | Kraus | ........................... | 411/510 |
| 4,981,310 A * | 1/1991 | Belisaire | .................... | 285/140.1 |
| 5,669,731 A * | 9/1997 | Hironaka et al. | ............ | 403/397 |
| 5,795,118 A * | 8/1998 | Osada et al. | .................. | 411/171 |
| 6,575,681 B2 * | 6/2003 | Kojima et al. | ............... | 411/508 |
| 6,916,145 B2 * | 7/2005 | Lydan | .......................... | 411/510 |
| 2003/0000048 A1 * | 1/2003 | Boville | ......................... | 24/297 |
| 2005/0079033 A1 * | 4/2005 | Benedetti et al. | ............ | 411/508 |
| 2008/0313868 A1 * | 12/2008 | Kamiya et al. | ................. | 24/453 |

FOREIGN PATENT DOCUMENTS

| | | |
|---|---|---|
| JP | 52-1364 | 1/1977 |
| JP | 52-001364 | 1/1977 |
| JP | 63-109518 U | 7/1988 |

* cited by examiner

*Primary Examiner* — Roberta Delisle

(74) *Attorney, Agent, or Firm* — Christensen Fonder P.A.

(57) ABSTRACT

A fastener may include an anchor that is configured to be inserted into an attaching hole formed in a panel. The anchor includes a pillar, at least one engagement strip positioned in at least one side of the pillar, and a guide block formed in a distal end of the pillar and having a planar shape corresponding to a shape of the attaching hole. The at least one engagement strip is capable of passing through the attaching hole while being flexed inwardly and engaging a periphery of the attaching hole when the anchor is inserted into the attaching hole. The guide block is configured to pass through the attaching hole only when an axis of the anchor is positioned substantially perpendicular to a surface of the panel.

6 Claims, 11 Drawing Sheets

FASTENERS

BACKGROUND OF THE INVENTION

1. Field of the Invention

The present invention relates to fasteners for attaching articles (e.g., wiring harnesses) to object members (e.g. body panels of a vehicle). More particularly, the present invention relates to fasteners for attaching articles to object members, which fasteners can be attached to the object members by inserting anchors of the fasteners into insertion holes formed in the object members.

2. Description of Related Art

A known fastener is taught by, for example, Japanese Laid-Open Patent Publication No. 52-1364. The known fastener includes a base to which a wiring harness (i.e., an article) can be connected, an anchor that is configured to be inserted into an attaching hole formed in a body panel (i.e., an object member) of a vehicle. The anchor is mainly composed of a center pillar that is vertically projected from the base, and a pair of engagement strips that are respectively laterally obliquely projected from a distal end of the pillar.

In order to attach the wiring harness to the body panel, the wiring harness is connected to the base of the fastener. Thereafter, the anchor is simply pressed into the attaching hole of the body panel, so as to be inserted thereinto while the engagement strips are respectively inwardly flexed. When the anchor is sufficiently inserted into the attaching hole, the engagement strips elastically engage an inner periphery of the attaching hole, so that the anchor can be retained therein. As a result, the fastener is attached to the body panel. Thus, the wiring harness can be attached to the body panel by the fastener.

Further, the anchor has a pressure receiving block that is formed in the distal end of the pillar. The pressure receiving block has a curved or chamfered guide surface that is formed in an outer surface thereof. The guide surface is shaped such that the anchor can be smoothly introduced into the attaching hole even when the anchor is obliquely inserted thereinto. That is, the guide surface is shaped to first contact a periphery of the attaching hole when the anchor is pressed into the attaching hole, so that the anchor can be smoothly introduced into the attaching hole.

According to the fastener thus constructed, because the guide surface is formed in the pressure receiving block of the anchor, the anchor can be smoothly introduced into the attaching hole even when the anchor is pressed into the attaching hole obliquely. However, the fastener can be attached to the body panel while the anchor is maintained in an inclined posture. As a result, the fastener may not be stably attached to the body panel. This means that the fastener may not have a sufficient load capacity. Therefore, there is a need in the art for an improved fastener.

BRIEF SUMMARY OF THE INVENTION

In one aspect of the present invention, a fastener may include an anchor that is configured to be inserted into an attaching hole formed in a panel. The anchor includes a pillar, at least one engagement strip positioned in at least one side of the pillar, and a guide block formed in a distal end of the pillar and having a planar shape corresponding to a shape of the attaching hole. The at least one engagement strip is capable of passing through the attaching hole while being flexed inwardly and engaging a periphery of the attaching hole when the anchor is inserted into the attaching hole. The guide block is configured to pass through the attaching hole only when an axis of the anchor is positioned substantially perpendicular to a surface of the panel.

According to the fastener of the aspect of the present invention, the anchor can be prevented from being obliquely introduced into the attaching hole. In particular, the anchor can be introduced into the attaching hole in a direction perpendicular to the surface of the panel. As a result, the fastener can be prevented from being obliquely connected to the panel. Thus, the fastener can be stably attached to the body panel. This means that the fastener can have a sufficient load capacity.

In another aspect of the present invention, the at least one engagement strip has an elastically deformable connecting portion connected to an inner surface of the guide block, so as to be flexed with respect to the pillar due to elastic deformation of the connecting portion. The pillar has at least one receiving portion corresponding to the at least one engagement strip. The at least one receiving portion is arranged and constructed to receive the connecting portion when the at least one engagement strip is flexed inwardly, so as to control deformation of the connecting portion.

According to this aspect, when the at least on engagement strip is flexed inwardly due to elastic deformation of the at least one connecting portion, deformation of the connecting portion can be controlled by the at least one receiving portion. As a result, when the anchor is retained in the attaching hole while the at least on engagement strip engages the periphery of the attaching hole, a shear surface of the at least one engagement strip can be prevented from being reduced.

In a further aspect of the present invention, the at least one engagement strip includes a pair of engagement strips that are positioned in both sides of the pillar. The engagement strips respectively have inclined outer surfaces that are obliquely extended outwardly from the connecting portions. The outer surfaces are configured to not simultaneously contact the panel until the guide block completely enter the attaching hole of the panel.

According to this aspect, when the anchor is obliquely pressed into the attaching hole, regardless of an insertion angle of the anchor with respect to the attaching hole, the guide block can be smoothly introduced into the attaching hole.

Additional objects, features and advantages of the present invention will be readily understood after reading the following detailed description together with the accompanying drawings and the claims.

DETAILED DESCRIPTION OF THE INVENTION

Detailed representative embodiments of the present invention are shown in FIGS. 1 to 13.

First Embodiment

In the following, a fist embodiment of the present invention will be described in detail with reference to FIGS. 1 to 8.

Figure 1:
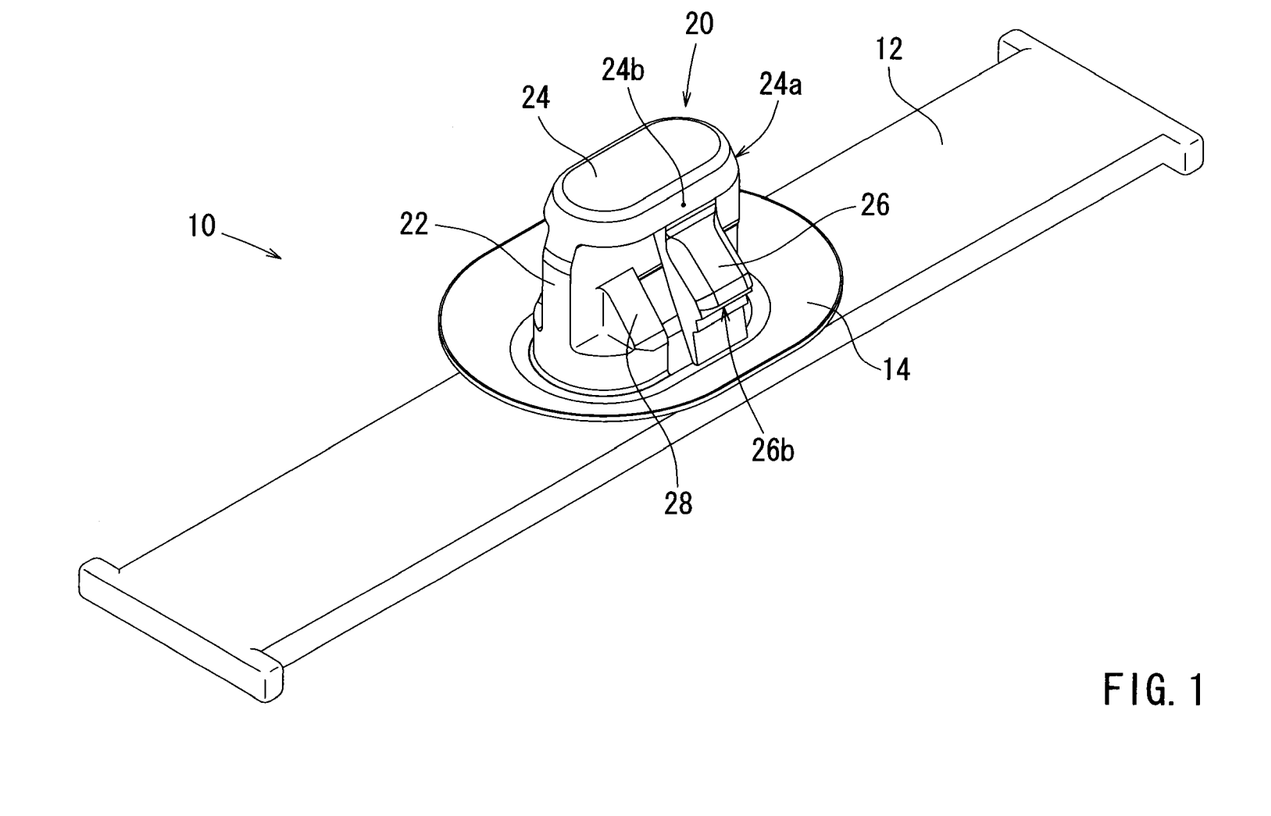
FIG. 1 is a perspective view of a fastener according to a first representative embodiment of the present invention.
Figure 2:
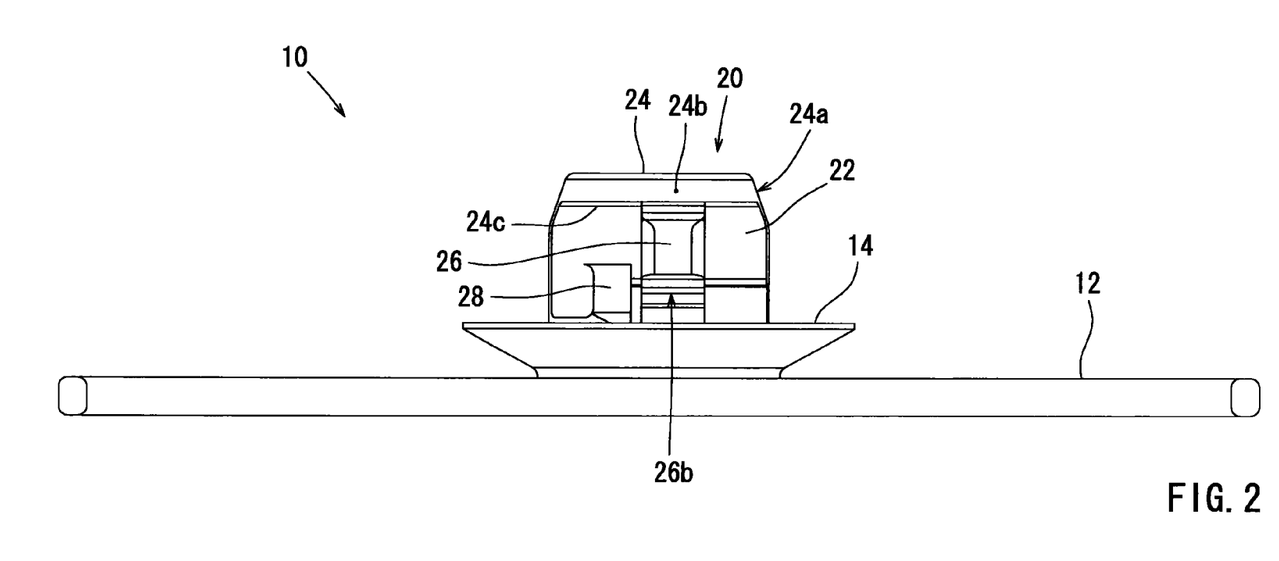
FIG. 2 is an elevational view of the fastener.

As shown in FIGS. 1 to 8, a fastener 10 may preferably be integrally formed as a unit or one piece by injection molding a synthetic resin, e.g., polyethylene. The fastener 10 may include a base 12, a stabilizer 14 and an anchor 20. As shown in FIG. 1, the base 12 may have an elongated plate-shape such that a wiring harness or other such articles (not shown) can be connected thereto using a band or tape (not shown). However, the base 12 may not be limited to such a shape.

Figure 7:
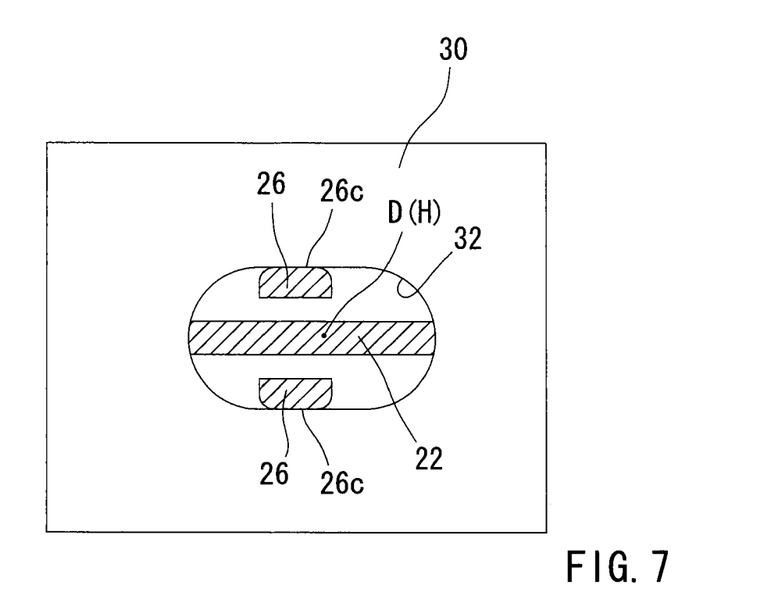
FIG. 7 is a transverse cross-sectional view of the anchor, which illustrates a condition in which the anchor is introduced into the attaching hole.

The stabilizer 14 may be positioned on the base 12 and have an upwardly flared dish-shape. The stabilizer 14 may be configured to elastically deform or flex with respect to the base 12. The anchor 20 may be positioned on a central portion of the stabilizer 14 so as to be projected upwardly therefrom. Further, the anchor 20 may be configured to be inserted into an attaching hole 32 formed in a panel 30 (i.e., an object member) of a vehicle (not shown). As shown in FIG. 7, the attaching hole 32 may have an elliptical (elongated) shape.

Figure 4:
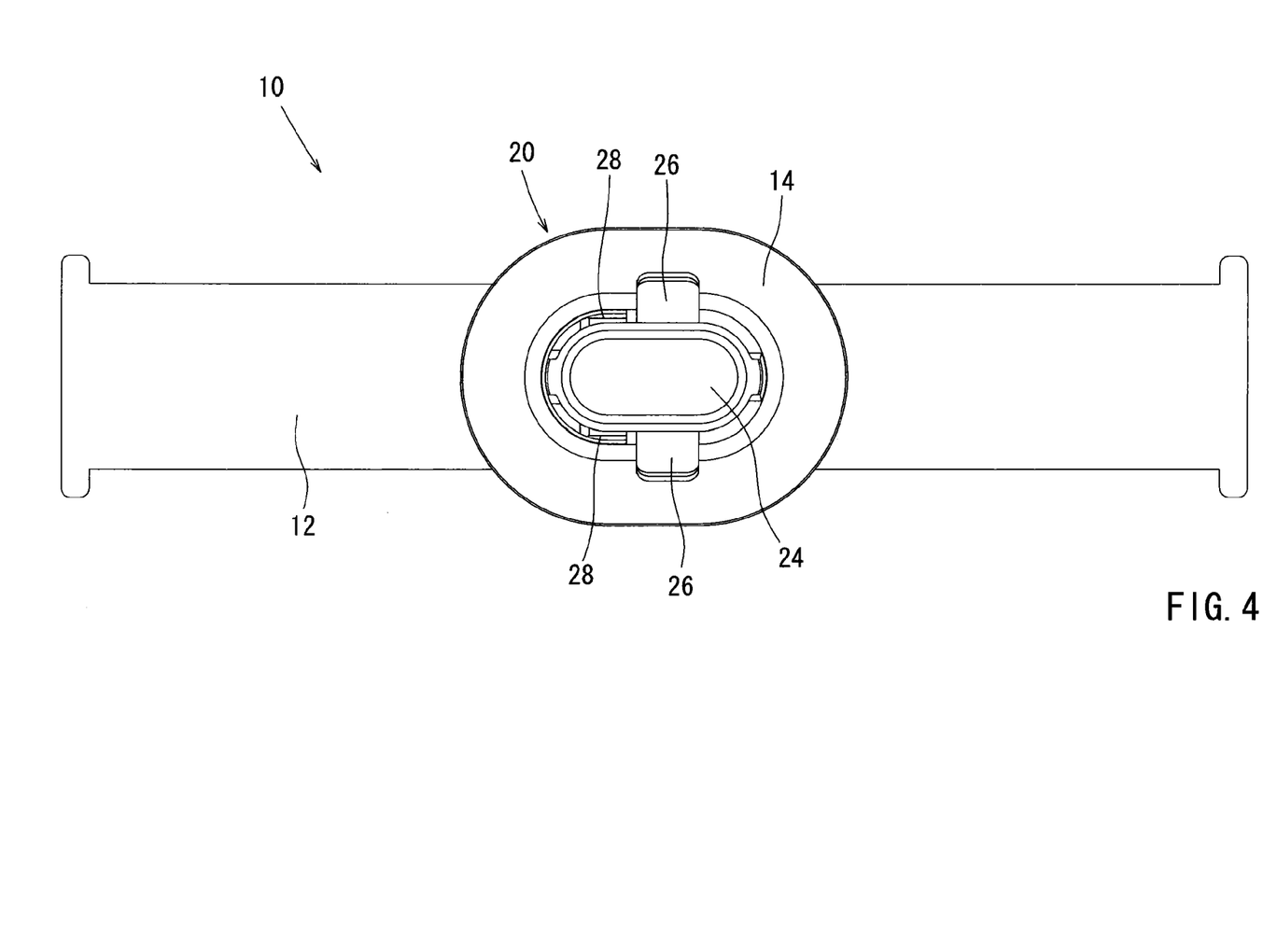
FIG. 4 is a plan view of the fastener.

The anchor 20 may have a pillar 22 that is integrated with the base 12, and a pair of engagement strips 26 (which may respectively be referred to as a right engagement strip 26 and a left engagement strip 26). The engagement strips 26 may be positioned in both (right and left) sides of the pillar 22, so as to be laterally aligned with each other (FIG. 4). As best shown in FIG. 7, the pillar 22 may be a plate-shaped member having a rectangular shape in transverse cross section. Further, the pillar 22 may have the substantially same length as a longer diameter of the attaching hole 32 or a length slightly smaller than the longer diameter of the attaching hole 32. The pillar 22 may be shaped to have rigidity that is required to the anchor 20. Further, as shown in FIG. 1, the pillar 22 may have a pair of reinforcement ribs 28 that are formed in a proximal end thereof. The reinforcement ribs 28 may respectively be oppositely positioned in both (right and left) sides of the pillar 22 and integrated with the base 12. Further, the pillar 22 may have a guide (control) block 24 that is formed in a distal end thereof.

As shown in FIG. 1, the guide block 24 may have an elliptical (elongated) planar shape. The elliptical shape of the guide block 24 may be shaped to be substantially identical to the elliptical shape of the attaching hole 32. Further, the guide block 24 may have a pair of eave-shaped projections 24b that are laterally oppositely projected in both lateral (right and left) sides of the pillar 22. Also, the guide block 24 may have a tapered outer circumferential surface 24a that is upwardly tapered at a predetermined taper angle. The guide block 24 may be configured to pass through the attaching hole 32 only when an axis D of the anchor 20 is aligned with an axis H of the attaching hole 32, i.e., only when the anchor 20 (the axis D of the anchor 20) is positioned substantially perpendicular to a surface of the panel 30.

Figure 3:
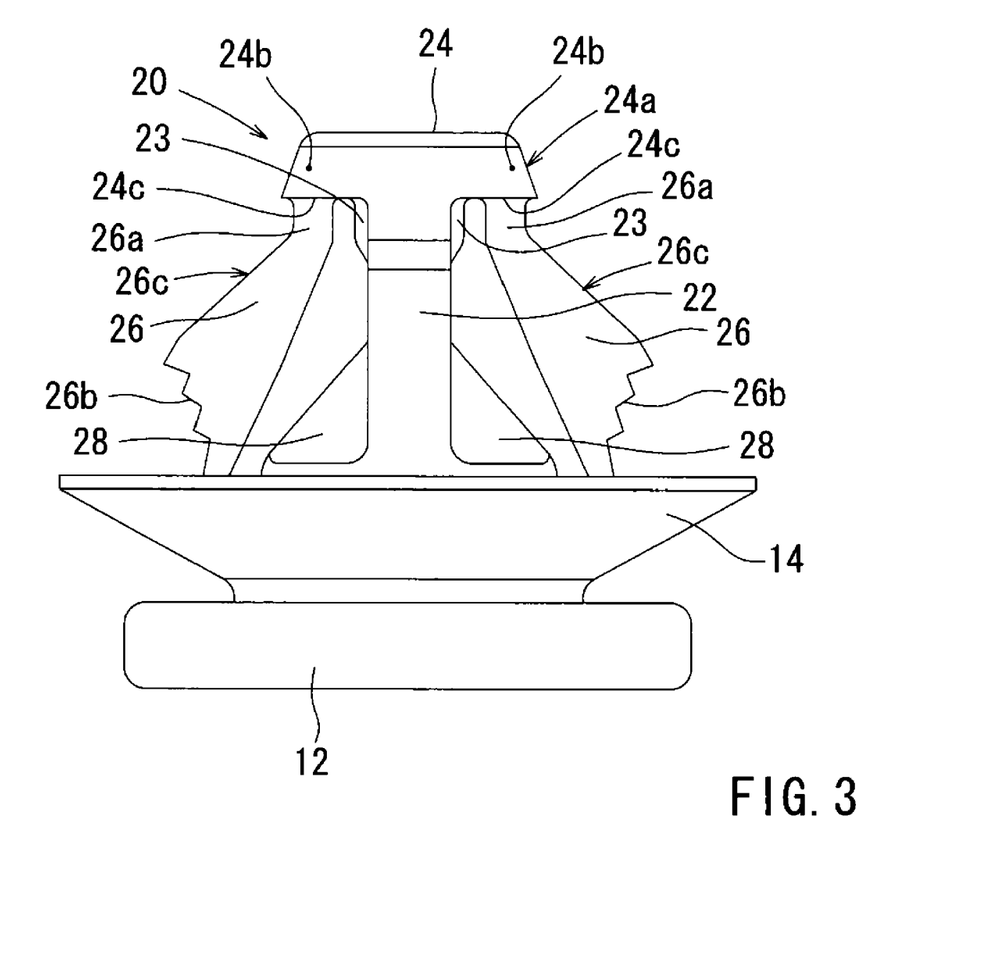
FIG. 3 is a side view of the fastener.
Figure 5:
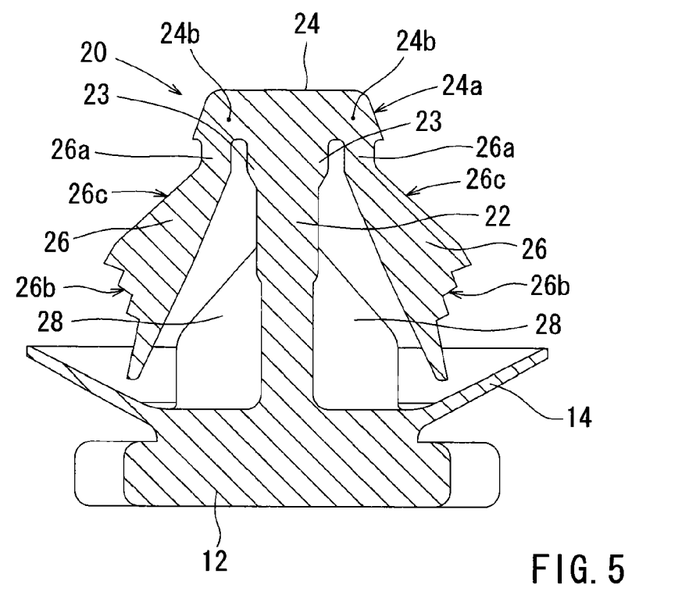
FIG. 5 is a vertical cross-sectional view of the fastener.

As shown in FIGS. 3 and 5, the pillar 22 may have a pair of receiving portions 23 that are oppositely positioned in both lateral sides of the pillar 22. The receiving portions 23 may respectively be positioned adjacent to inner (lower) surfaces 24c of the projections 24b so as to be aligned with the engagement strips 26 (which will be hereinafter described).

As shown in FIGS. 3 and 5, the engagement strips 26 may respectively be oppositely positioned in both lateral sides of the pillar 22 so as to correspond to the receiving portions 23 formed in the pillar 22. The engagement strips 26 may preferably be formed as cantilevered strips. In particular, the engagement strips 26 may respectively be connected to the inner surfaces 24c of the projections 24b of the guide block 24 via straight elastically deformable connecting portions 26a that are formed in proximal (upper) end portions of the engagement strips 26. The connecting portions 26a may preferably be positioned inside of the outer circumferential surface 24a of the guide block 24. Conversely, distal (lower) end portions of the engagement strips 26 may form free ends. Further, the engagement strips 26 may be configured to be diagonally extended outwardly from the connecting portions 26a.

The connecting portions 26a of the engagement strips 26 may relatively be thinned, so as to be easily elastically deformed. Thus, the engagement strips 26 can be flexed with respect to the pillar 22 due to elastic deformation of the connecting portions 26a.

Figure 6:
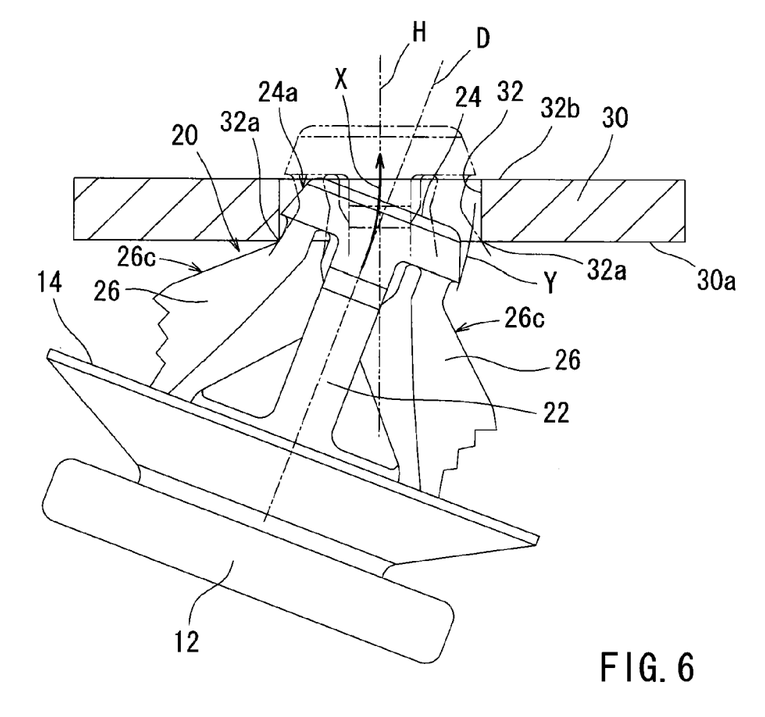
FIG. 6 is an explanatory view of the fastener, which illustrates a condition in which an insertion operation of an anchor of the fastener into an attaching hole of a body panel is started.

As shown in FIGS. 3, 5 and 6, the engagement strips 26 may respectively have inclined outer surfaces 26c that are obliquely extended outwardly from the connecting portions 26a. That is, each of the engagement strips 26 may be thickened toward the free end thereof. As a result, the free end of each of the engagement strips 26 may have a vertically widened inclined surface. Further, each of the engagement strips 26 may have an engagement portion 26b that is formed in the inclined surface of the free end thereof. The engagement portion 26b may have a plurality of (three in this embodiment) steps each of which is configured to engage an inner peripheral surface 32b (FIG. 8) of the attaching hole 32 of the panel 30 when the anchor 20 is pressed into the attaching hole 32. Further, the outer surfaces 26c may be configured to not simultaneously interfere with the panel 30 (an outer periphery 32a of the attaching hole 32 (FIG. 6)) until the guide block 24 completely enter the attaching hole 32 of the panel 30 when the anchor 20 is inserted into the attaching hole 32.

The operation of the fastener 10 thus constructed will now be described. In order to attach the wiring harness to the panel 30, the wiring harness may be disposed longitudinally along the base 12 of the fastener 10 and may be bundled therewith using the band or tape, so that the fastener 10 can be combined with the wiring harness. Thereafter, the anchor 20 of the fastener 10 may be positioned adjacent to the panel 30 such that the axis D of the anchor 20 can be aligned with the axis H of the attaching hole 32. In this condition, the guide block 24 can be positioned to pass through the attaching hole 32. Subsequently, the anchor 20 is pressed into the attaching hole 32. As a result, the guide block 24 formed in the pillar 22 may enter the attaching hole 32, so that the outer surfaces 26c of the (right and left) engagement strips 26 can interfere with the outer periphery 32a of the attaching hole 32.

Figure 8:
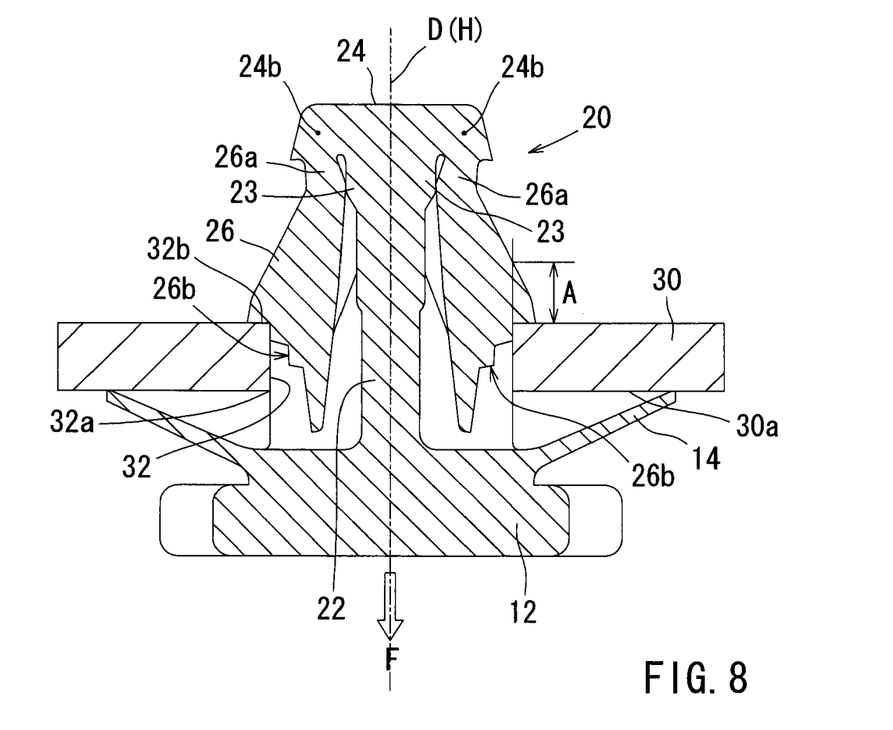
FIG. 8 is a vertical cross-sectional view of the fastener, which illustrates a condition in which the anchor is introduced into the attaching hole.

When the anchor 20 is further pressed into the attaching hole 32, the engagement strips 26 can pass through the attaching hole 32 with the guide block 24 while being elastically flexed inwardly due to elastic deformation of the connecting portions 26a. As shown in FIG. 8, when the anchor 20 reaches a predetermined position in the attaching hole 32, the engagement strips 26 are respectively elastically outwardly restored or spread, so that one of the steps of the engagement portion 26b of each of the engagement strips 26 can elastically engage the inner peripheral surface 32b of the attaching hole 32 of the panel 30. As a result, the anchor 20 is retained in the attaching hole 32. Simultaneously, the stabilizer 14 elastically contacts an outer surface 30a of the panel 30, so that the anchor 20 can be reliably retained in the attaching hole 32. Thus, the fastener 10 can be fixedly connected to the panel 30. As a result, the wiring harness can be attached to the panel 30.

Generally, in order to attach the wiring harness to the panel 30, a plurality of additional fasteners that respectively have the same construction as the fastener 10 may be used. These fasteners can be connected to the panel 30 in the same manner as described above.

As described above, the anchor 20 of the fastener 10 may preferably be pressed into the attaching hole 32 while the axis D of the anchor 20 is aligned with the axis H of the attaching hole 32. However, the anchor 20 may be obliquely pressed into the attaching hole 32 in some cases. That is, the anchor 20 may be pressed into the attaching hole 32 while the axis D of the anchor 20 is inclined with respect to the axis H of the attaching hole 32.

For example, as shown by solid lines in FIG. 6, when the anchor 20 is obliquely pressed into the attaching hole 32 at a desired insertion angle, a left side portion of the guide block 24 of the pillar 22 can be first introduced into the attaching hole 32, so that the outer surfaces 26c of the left engagement strip 26 can contact the outer periphery 32a of the attaching hole 32. At this time, a right side portion of the guide block 24 cannot still be introduced into the attaching hole 32, so that the outer surfaces 26c of the right engagement strip 26 can be spaced from the outer periphery 32a of the attaching hole 32.

As described above, the guide block 24 may be configured to pass through the attaching hole 32 only when the axis D of the anchor 20 is aligned with the axis H of the attaching hole 32. Therefore, when the anchor 20 is further pressed into the attaching hole 32, the anchor 20 can be moved toward the attaching hole 32 while it is rotated to the left, i.e., while it is rotated in a direction shown by an arrow X in FIG. 6. As a result, the right side portion of the guide block 24 can be gradually introduced into the attaching hole 32 along a trajectory Y (FIG. 6), so that the guide block 24 can completely enter the attaching hole 32. When the guide block 24 completely enters the attaching hole 32, the outer surfaces 26c of both of the (right and left) engagement strips 26 can contact the outer periphery 32a of the attaching hole 32. At the same time, the axis D of the anchor 20 can be aligned with the axis H of the attaching hole 32. Thus, the guide block 24 can be placed in a condition in which it can pass through the attaching hole 32.

In this condition, when the anchor 20 is further pressed into the attaching hole 32, the engagement strips 26 can pass through the attaching hole 32 with the guide block 24 while being flexed inwardly due to elastic deformation of the connecting portions 26a (broken lines in FIG. 6). As shown in FIG. 8, when the anchor 20 reaches the predetermined position in the attaching hole 32, the engagement strips 26 are respectively elastically outwardly restored or spread, so that one of the steps of the engagement portion 26b of each of the engagement strips 26 can elastically engage the inner peripheral surface 32b of the attaching hole 32 of the panel 30. As a result, the anchor 20 is retained in the attaching hole 32. Simultaneously, the stabilizer 14 elastically contacts the outer surface 30a of the panel 30, so that the anchor 20 can be reliably retained in the attaching hole 32. Thus, the fastener 10 can be fixedly connected to the panel 30. As a result, the wiring harness can be attached to the panel 30.

According to the fastener 10 thus constructed, the guide block 24 cannot pass through the attaching hole 32 unless the axis D of the anchor 20 is aligned with the axis H of the attaching hole 32. Therefore, the anchor 20 can be prevented from being obliquely introduced into the attaching hole 32. As a result, the fastener 10 can be prevented from being obliquely connected to the panel 30.

Further, when the anchor 20 is obliquely pressed into the attaching hole 32, regardless of the insertion angle of the anchor 20 with respect to the attaching hole 32, one of the outer surfaces 26c of the engagement strips 26 cannot contact the panel 30 until the guide block 24 completely enters the attaching hole 32. Therefore, one (e.g., the right side portion) of side portions of the guide block 24 can be smoothly introduced into the attaching hole 32 along a predetermined trajectory while the other (e.g., the left side portion) of the side portions of the guide block 24 is introduced into the attaching hole 32.

Further, because the connecting portions 26a of the engagement strips 26 is relatively be thinned, the engagement strips 26 can be relatively easily flexed. Therefore, the fastener 10 (the anchor 20) can be easily inserted into the attaching hole 32. That is, an insertion load of the fastener 10 into the attaching hole 32 can be reduced.

Further, as shown in FIG. 7, when the anchor 20 is pressed into the attaching hole 32 while the axis D of the anchor 20 is aligned with the axis H of the attaching hole 32, in an initial condition thereof, both of end surfaces of the pillar 22 may contact an inner circumferential surface of the attaching hole 32. In addition, both of the outer surfaces 26c of the engagement strips 26 may contact the outer periphery 32a of the attaching hole 32. Thus, the anchor 20 can be held in the attaching hole 32 via four portions, i.e., both of the end surfaces of the pillar 22 and both of the outer surfaces 26c of the engagement strips 26. Therefore, the anchor 20 can be maintained in a condition in which the axis D thereof is aligned with the axis H of the attaching hole 32, so that the anchor 20 can be smoothly and reliably inserted into the attaching hole 32.

As previously described, when the fastener 10 is connected to the panel 30 (i.e., when the anchor 20 is retained in the attaching hole 32), the engagement strips 26 can be flexed inwardly due to elastic deformation of the connecting portions 26a. At this time, as shown in FIG. 8, the connecting portions 26a can respectively be received by the receiving portions 23 formed in the pillar 22. As a result, deformation of the connecting portions 26a can be controlled or restricted (in particular, the connecting portions 26a can be prevented from being excessively deformed inwardly), so that each of the engagement strips 26 can have a sufficient and constant shear surface A.

Figure 9:
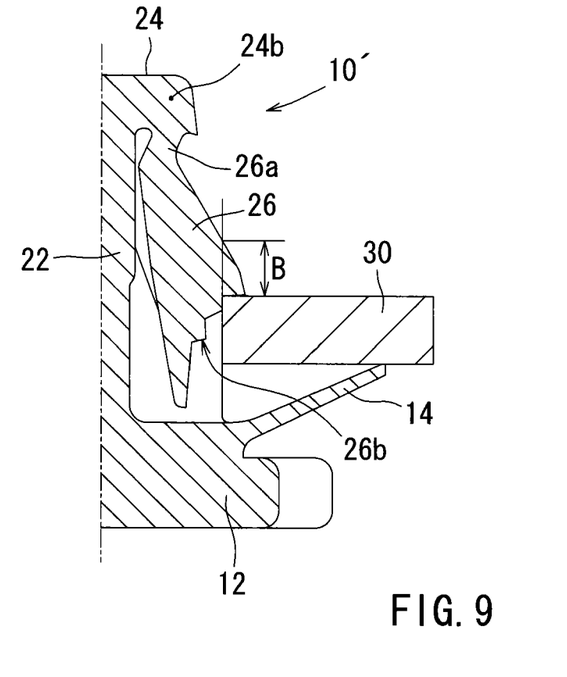
FIG. 9 is a partially vertical cross-sectional view of a fastener in a comparative example, which illustrates a condition in which an anchor of the fastener is introduced into an attaching hole of a body panel.

To the contrary, as shown in FIG. 9, in a fastener 10' in which the pillar 22 does not have receiving portions, when the engagement strips 26 is flexed inwardly due to elastic deformation of the connecting portions 26a, the connecting portions 26a can be excessively deformed, so that each of the engagement strips 26 can have an insufficient or reduced shear surface B that is smaller than the shear surface A.

According to the fastener 10, the engagement strips 26 can have the constant shear surface A when the fastener 10 is connected to the panel 30 despite the fact that the engagement strips 26 are shaped to be relatively easily flexed (i.e., the connecting portions 26a of the engagement strips 26 are thinned). Therefore, the fastener 10 can have a stable retaining force against an extraction force F (FIG. 8) when it is connected to the panel 30. As a result, the fastener 10 can have a sufficient retaining force against the extraction force F despite the fact that the insertion load of the fastener 10 into the attaching hole 32 can be reduced.

Second Embodiment

Figure 10:
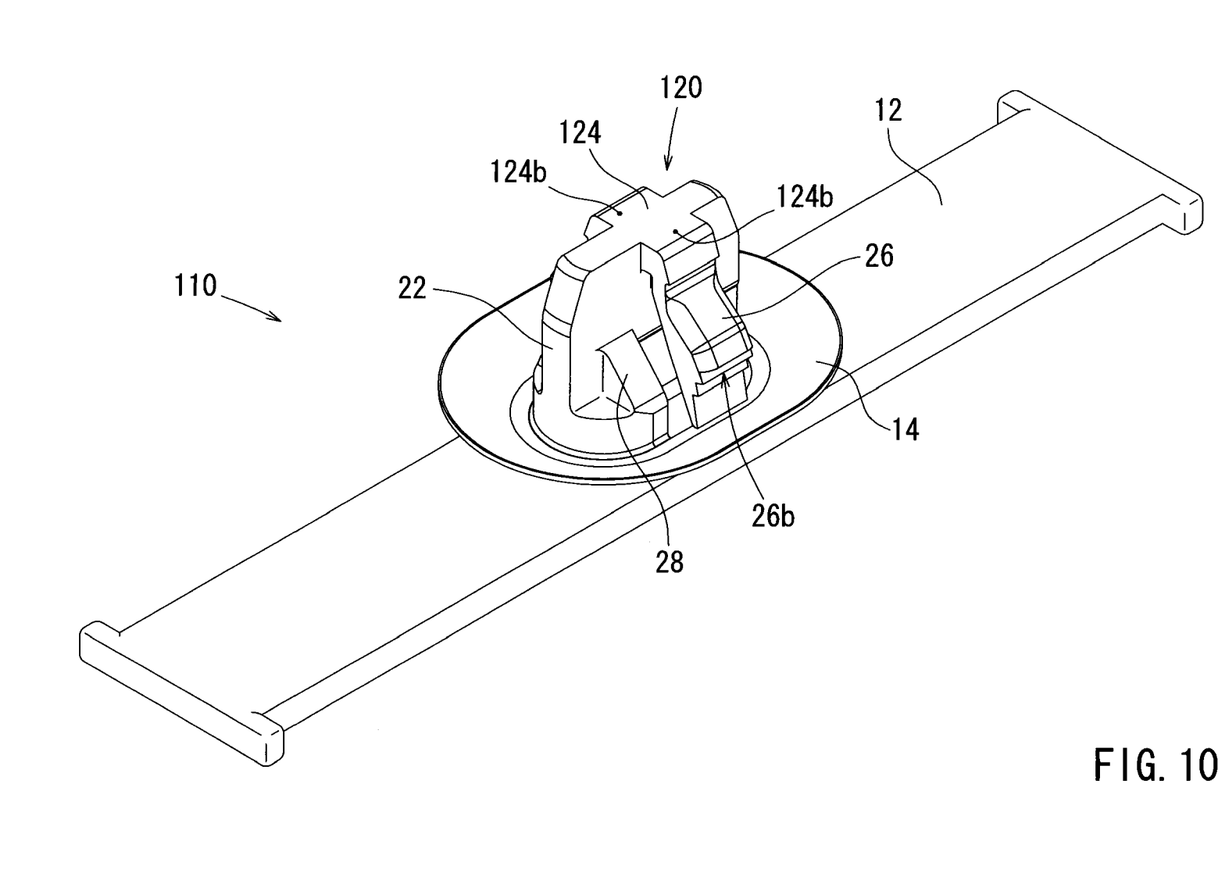
FIG. 10 is a perspective view of a fastener according to a second representative embodiment of the present invention.
Figure 11:
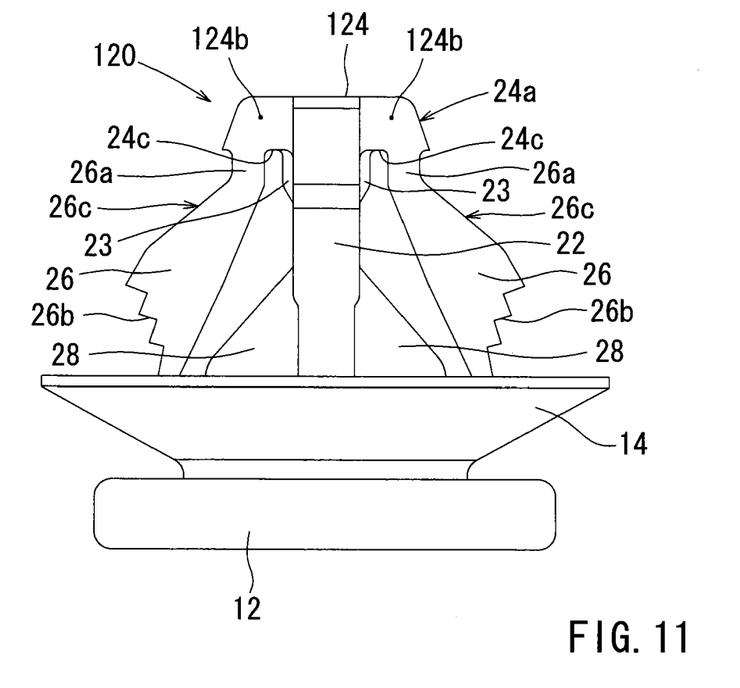
FIG. 11 is a side view of the fastener.
Figure 12:
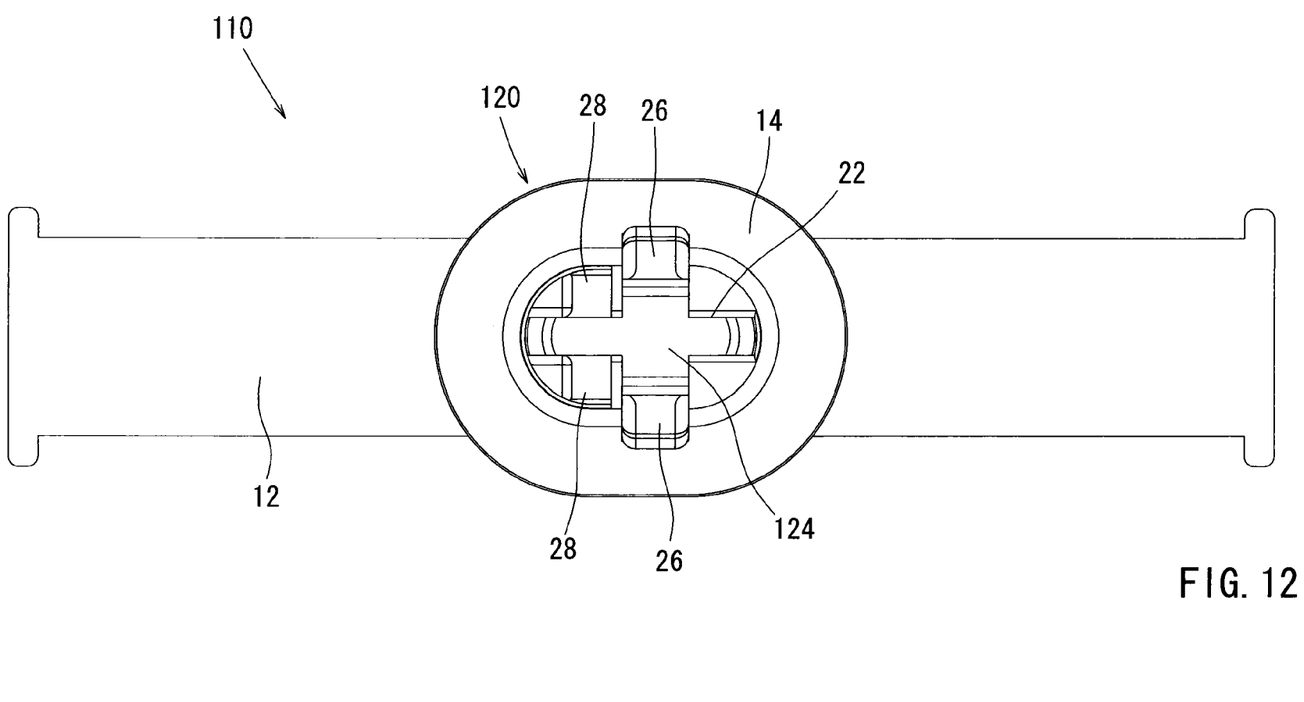
FIG. 12 is a plan view of the fastener.

The second detailed representative embodiment will now be described with reference to FIGS. 10 to 12.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, similar to the first embodiment, an anchor 120 of a fastener 110 may have a guide block 124 that is formed in the pillar 22. Further, the guide block 124 may have a pair of eave-shaped projections 124b. However, unlike the first embodiment, the projections 124b may be formed in limited portions of both (right and left) sides of the guide block 124. That is, the projections 124b may be formed in the guide block 124 so as to correspond to only the engagement strips 26. In particular, the projections 124b may have the substantially same width as the connecting portions 26a of the engagement strips 26. Naturally, similar to the guide block 24 of the first embodiment, the guide block 124 may be configured to pass through the attaching hole 32 only when an axis of the anchor 120 is aligned with the axis H of the attaching hole 32.

Third Embodiment

Figure 13:
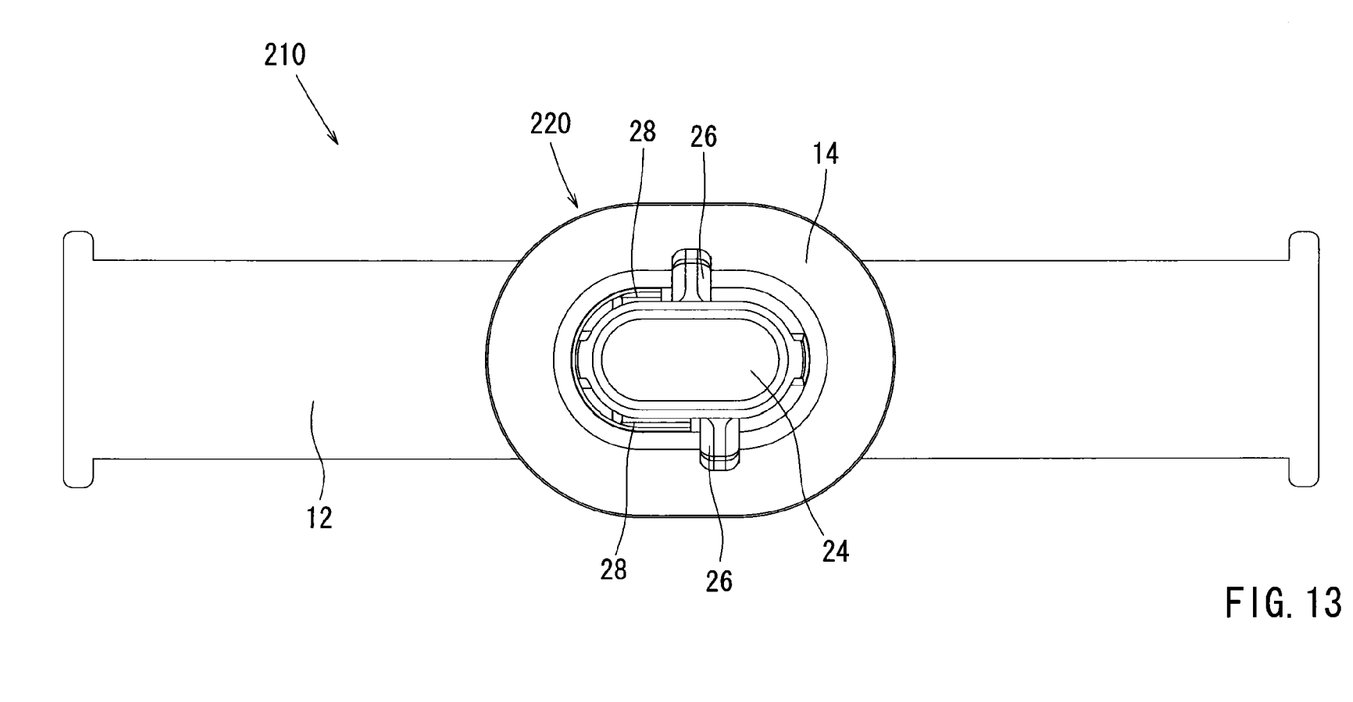
FIG. 13 is a plan view of a fastener according to a third representative embodiment of the present invention.

The third detailed representative embodiment will now be described with reference to FIG. 13.

Because the embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, similar to the first embodiment, an anchor 220 of a fastener 210 may have the engagement strips 26 that are positioned in both (right and left) sides of the pillar 22. However, in this embodiment, the engagement strips 26 may be positioned, so as to not be laterally aligned with each other (FIG. 13). That is, the engagement strips 26 may be longitudinally displaced to each other. Naturally, the receiving portions 23 may respectively be positioned so as to correspond to the engagement strips 26.

Naturally, various changes and modifications may be made to the present invention without departing from the scope of the invention. For example, in the embodiments, the pillar 22 has the engagement strips 26 that are formed in both sides thereof. However, the pillar 22 may have a single engagement strip that is formed in one side thereof. In this case, the other side of the pillar 22 may preferably be shaped to contact or engage the inner peripheral surface 32b of the attaching hole 32.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A fastener comprising an anchor that is configured to be inserted into an attaching hole formed in a panel,
   wherein the anchor comprises a pillar, a pair of engagement strips positioned in both sides of the pillar, and a guide block formed in a distal end of the pillar and having a planar shape corresponding to a shape of the attaching hole,
   wherein the pair of engagement strips are configured to pass through the attaching hole while being flexed inwardly and engaging a periphery of the attaching hole when the anchor is inserted into the attaching hole,
   wherein the guide block has a pair of projections that are laterally projected from the pillar, and outer surfaces that are formed in the projections,
   wherein the engagement strips respectively have elastically deformable connecting portions connected to inner surfaces of the projections of the guide block, and inclined outer surfaces that are obliquely extended outwardly from the connecting portions, so as to be flexed with respect to the pillar due to elastic deformation of the connecting portion,
   wherein the connecting portions of the engagement strips are respectively positioned radially inside the outer surface of the guide block,
   wherein the anchor is obliquely inserted into the attaching hole of the panel, only the outer surface of one of the engagement strips contacts a periphery of the attaching hole, and when upon rotation of the anchor, an axis of the anchor is aligned with an axis of the attaching hole, the guide block passes through the attaching hole, so that the outer surface of the other of the engagement strips contacts the periphery of the attaching hole.

2. The fastener of claim 1, wherein the pillar has a pair of receiving portions corresponding to the strip connecting portions of the engagement strips, and wherein the receiving portions are arranged and constructed to receive the connecting portion when the engagement strips are flexed inwardly, so as to control deformation of the connecting portions.

3. The fastener of claim 1, wherein the anchor is configured to be held in the attaching hole via end surfaces of the pillar and the outer surfaces of the engagement strips when the anchor is inserted into the attaching hole.

4. A fastener comprising an anchor that is configured to be inserted into an attaching hole formed in a panel, wherein the anchor comprises a pillar, a pair of engagement strips positioned in both sides of the pillar, and a guide block formed in a distal end of the pillar and having a planar shape corresponding to a shape of the attaching hole, wherein the pair of engagement strips are configured to pass through the attaching hole while being flexed inwardly and engaging a periphery of the attaching hole when the anchor is inserted into the attaching hole, wherein the guide block has a pair of projections that are laterally projected from the pillar, and outer surfaces that are formed in the projections, wherein the engagement strips respectively have elastically deformable connecting portions connected to inner surfaces of the projections of the guide block at positions spaced from the pillar, and inclined outer surfaces that are obliquely extended outwardly from the connecting portions, so as to be flexed with respect to the pillar due to elastic deformation of the connecting portion, wherein the connecting portions of the engagement strips are respectively positioned radially inside the outer surfaces of the guide block, and wherein each of the connecting portions of the engagement strips has a uniform thickness and a substantial length and extends linearly from each of the inner surfaces of the projections along the pillar.

5. A fastener comprising an anchor that is configured to be inserted into an elliptical attaching hole formed in a panel, wherein the anchor comprises a pillar, a pair of engagement strips positioned in both sides of the pillar, and a guide block formed in a distal end of the pillar and having a planar shape corresponding to a shape of the attaching hole, wherein the pair of engagement strips are configured to pass through the attaching hole while being flexed inwardly and engaging a periphery of the attaching hole when the anchor is inserted into the attaching hole, wherein the guide block has a pair of projections that are laterally projected from the pillar, and outer surfaces that are formed in the projections, wherein the engagement strips respectively have elastically deformable connecting portions connected to inner surfaces of the projections of the guide block, and inclined outer surfaces that are obliquely extended outwardly from the connecting portions, so as to be flexed with respect to the pillar due to elastic deformation of the connecting portion, wherein the connecting portions of the engagement strips are respectively positioned radially inside the outer surfaces of the guide block, wherein the pillar comprises a plate-shaped member having a rectangular shape in transverse cross section and having a width substantially identical to a longer diameter of the attaching hole, wherein the guide block has an elliptical planar shape substantially identical to the shape of the attaching hole, and wherein the projections of the guide block are formed as eave-shaped portions that extend in a width direction of the pillar.

6. The fastener of claim 5, wherein the connecting portions of the engagement strips are respectively connected to the inner surfaces of the projections of the guide block at positions spaced from the pillar, and wherein each of the connecting portions of the engagement strips has a uniform thickness and a substantial length and extends linearly from each of the inner surfaces of the projections along the pillar.

* * * * *